United States Patent [19]
Hosoya et al.

[11] Patent Number: 5,593,216
[45] Date of Patent: Jan. 14, 1997

[54] ANTILOCK BRAKE DEVICE VALVE ARRANGEMENT

[75] Inventors: Yukio Hosoya; Kei Fukuyo, both of Hamakita, Japan

[73] Assignee: Nisshinbo Industries, Inc., Tokyo, Japan

[21] Appl. No.: 628,443

[22] Filed: Apr. 5, 1996

Related U.S. Application Data

[63] Continuation of Ser. No. 204,455, Mar. 2, 1994, abandoned.

[30] Foreign Application Priority Data

Mar. 5, 1993 [JP] Japan .................. 5-069134

[51] Int. Cl.$^6$ .................................................. B60T 8/36
[52] U.S. Cl. .................. 303/119.2; 303/113.1; 303/116.4
[58] Field of Search .................. 303/113.1, 115.1, 303/115.4, 119.2, 116.4, 113.5; 137/596.17, 596.16, 884

[56] References Cited

U.S. PATENT DOCUMENTS

| | | | |
|---|---|---|---|
| 4,761,042 | 8/1988 | Seibert et al. | 303/119.2 X |
| 4,796,958 | 1/1989 | Brown, Jr. | 303/113.1 |
| 4,953,918 | 9/1990 | Hashida et al. | 303/116.4 X |
| 5,244,262 | 9/1993 | Kehl et al. | 303/119.2 |
| 5,326,161 | 7/1994 | Adams et al. | 303/119.2 |

FOREIGN PATENT DOCUMENTS 3169769  7/1991  Japan .................. 303/113.5

Primary Examiner—Robert J. Oberleitner
Assistant Examiner—Peter M. Poon
Attorney, Agent, or Firm—Nikaido, Marmelstein, Murray & Oram LLP

[57] ABSTRACT

An antilock brake device installed within the brake lines connecting the master cylinder with the four wheel brakes which includes a motor-driven pump and several solenoid valves and connecting lines thereof mounted in a housing. A series of valve mounting bores to house a maximum of eight valves are arranged in lattice-fashion on one planar surface of the housing. Depending on the brake circuit configuration, four or six electromagnetically-actuated valves are mounted in the valve mounting bores, and one or two pressure control valves, actuated by the pressure of the brake fluid within the brake lines, are mounted in the remaining valve mounting bores. This provides an antilock brake device in which the solenoid valves and pressure control valves are mounted within the same housing, thereby increasing the commonalty of the housing for different types of brake circuits to produce a more compact, more lightweight, and less expensive device.

4 Claims, 20 Drawing Sheets

ANTILOCK BRAKE DEVICE VALVE ARRANGEMENT

This application is a continuation of application Ser. No. 08/204,455 filed Mar. 2, 1994 now abandoned.

BACKGROUND OF THE INVENTION

This invention relates to an antilock brake device equipped with a pressure control valve and usable in a two-line brake circuit of an automotive vehicle.

FIG. 21 is a conceptual diagram of an antilock brake system (ABS). An antilock brake device 104, comprised of several solenoid valves, a pump driven by a motor 105 and other components inside a housing, is installed in the brake circuit 103 that connects the master cylinder 101 to each wheel brake 102.

Moreover, a pressure control valve 106 can be installed within the rear wheel system of brake circuit 103. Such a valve serves to prevent the front brakes from locking before the rear brakes if the brakes are applied and the ABS does not function, thereby maintaining stability of the vehicle.

A conventional ABS system as described is subject to several difficulties. Additional space is required for the pressure control valve 106, making it more difficult to mount the device. The pressure control valve 106 must be mounted separately from the antilock brake device, thereby increasing the number of installation steps and attendant cost. Since the pressure control valve 106 is separate and independent from the antilock brake device, a separate housing to mount the internal parts of the pressure control valve 106 is required, which increases both the cost and the weight of the overall device. Installing the pressure control valve 106 inside the brake circuit creates a large number of pipe joints and increases the danger of brake fluid leaks. Incorporation of the pressure control valve 106 inside the antilock brake device 104 has been proposed, but in such a case, the housing must be enlarged, making the device more difficult to mount. As well, the housing must be of an unique structure requiring more tools and equipment for its construction. The attendant manufacturing costs precludes the usage of the device.

OBJECT AND SUMMARY OF THE INVENTION

The object of this invention is to provide an antilock brake device in which the pressure control valves and the solenoid valves can be mounted within the same housing without enlarging the housing, thereby increasing the commonalty of the housing for use in different types of brake systems and thus lowering the cost of the device.

This invention is an antilock brake device that can be installed in the brake lines connecting the master cylinder with the four wheel brakes. The device includes a motor-driven pump and several solenoid valves and connecting lines thereof mounted in a housing wherein a series of valve mounting bores to house a maximum of eight valves are arranged in lattice-fashion on one planar surface of the housing. Depending on the actual brake circuit configuration, four or six electromagnetically-actuated valves are mounted in the valve mounting bores, and one or two pressure control valves, actuated by the pressure of the brake fluid within the brake lines, are mounted in the remaining bores.

As well, this invention is an antilock brake device that can be installed into a two-line brake circuit where each line connects a front or rear brake with its diagonally opposite counterpart (hereafter a two-line diagonal brake circuit). An inlet solenoid valve to open or close a connection between the master cylinder and the front wheel brake, a selector solenoid valve to open or close a connection between the front wheel brake and rear wheel brake, and an outlet solenoid valve to open or close a connection between the rear wheel brake and the reservoir are mounted for each circuit in six of the valve mounting bores in the housing. A pressure control valve to control the pressure of the rear wheel brake is mounted for each circuit in two of the valve mounting bores in the housing between the outlet port to the rear wheel brake and the outlet solenoid valve.

Further, this invention is an antilock brake device that can be installed into a two-line front brakes and rear brakes circuit. Two combinations of an inlet solenoid valve and outlet solenoid valve are mounted for the front brakes circuit and one combination of an inlet solenoid valve and outlet solenoid valve is mounted for the rear brakes circuit in six of the valve mounting bores in the housing. A pressure control valve to control the pressure of the rear wheel brakes is mounted for the rear brakes circuit in one valve mounting bore between the outlet port to the rear wheel brakes and the outlet solenoid valve.

Moreover, this invention is an antilock brake device that can be installed into a two-line front brakes and rear brakes circuit. Two combinations of an inlet solenoid valve and outlet solenoid valve are mounted for the front brakes circuit and one combination of an inlet solenoid valve and outlet solenoid valve is mounted for the rear brakes circuit in six of the valve mounting bores in the housing. A pressure control valve to control the pressure of the rear wheel brakes is mounted for the rear brakes circuit in one valve mounting bore between the inlet port to the rear wheel brakes and the inlet solenoid valve.

This invention is effective to achieve its object for the following reasons. The pressure control valve can be mounted with the solenoid valves into a housing of the same outside diameter as a conventional housing with eight solenoid valves as used for a two-line diagonal brake circuit. Thus the antilock brake device need not be enlarged, and it will be easier to mount. The same housing can be used for different brake line configurations and different control methods with only very minor changes in fabrication and assembly, thus increasing manufacturing efficiency and reducing manufacturing costs. The pressure control valve need not be mounted outside of the housing. This means no extra space nor extra work is required to mount the pressure control valve, thus reducing manufacturing costs. The pressure control valve need not be installed outside of the antilock brake device thus preventing the increased danger of brake fluid leaks.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

EXAMPLE 1

A first embodiment of this invention is explained following with reference to the attached diagrams.

Figure 1:
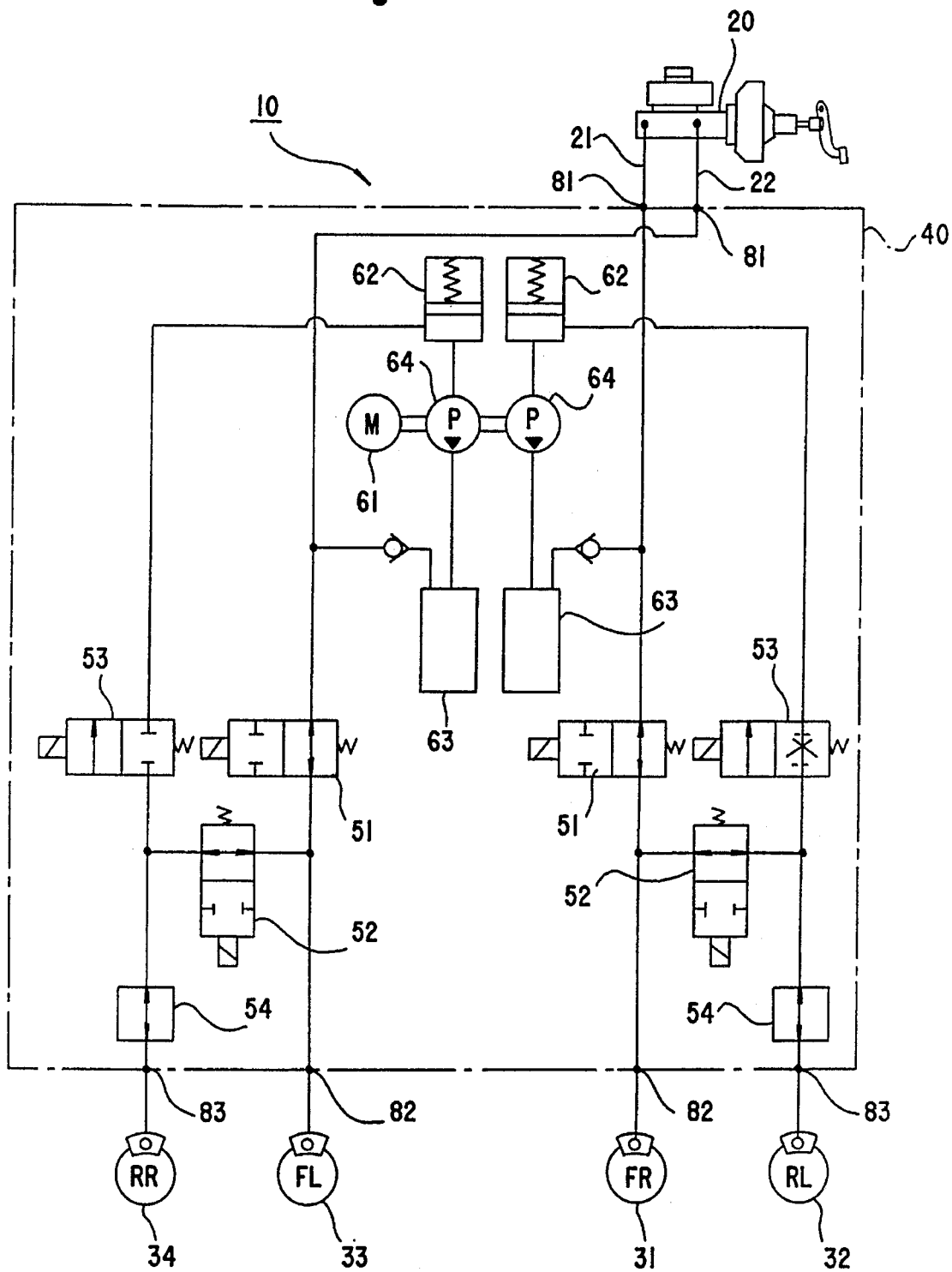
FIG. 1 is a diagram of a brake circuit with installed antilock brake device in accordance with the present invention.
Figure 2:
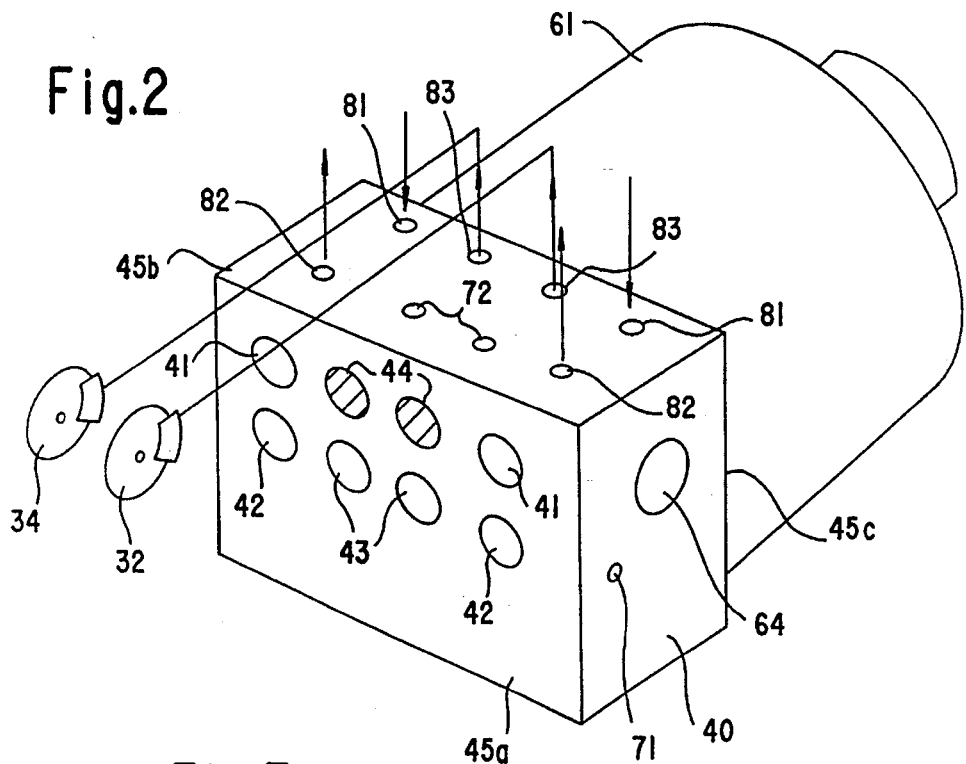
FIG. 2 is a perspective view of the housing of the antilock brake device of this invention as embodied in Example 1.

FIG. 1 illustrates an example of the antilock brake device 10 installed in a two-line diagonal brake circuit. FIG. 2 is a perspective diagram of the antilock brake device 10. The antilock brake device 10 is installed across the main brake lines 21, 22 that link the master cylinder 20 to each wheel brake 31, 32, 33, 34, and is configured from components, to be described later, mounted inside a housing 40.

As viewed from the front face 45, as shown in FIG. 2, the box-shaped housing 40 is symmetrical about the vertical center, and has eight valve mounting bores 41–44 in the front face laid out in two rows.

In this embodiment, of the eight valve mounting bores, bores 41, 42, 43, 43 are used to mount solenoid valves while the two inner bores 44, 44 on the top row are used to mount pressure control valves. As shown in FIG. 2, inlet ports 81, 81 connected to the master cylinder 20, outlet ports 82, 82 connected to the front wheel brakes 31, 33, and outlet ports 83, 83 connected to the rear wheel brakes 32, 34 are on the top face 45b of the housing 40.

Figure 3:
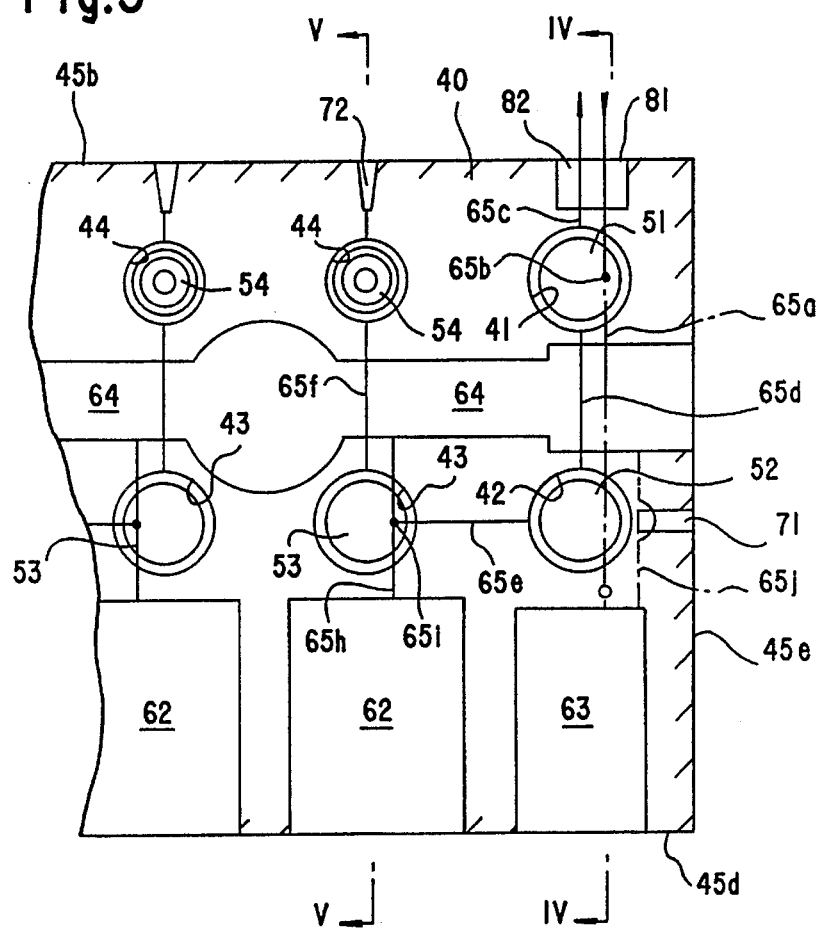
FIG. 3 is a partial cross sectional view and diagram of the front face of the housing of the antilock brake device of this invention as embodied in Example 1.
Figure 4:
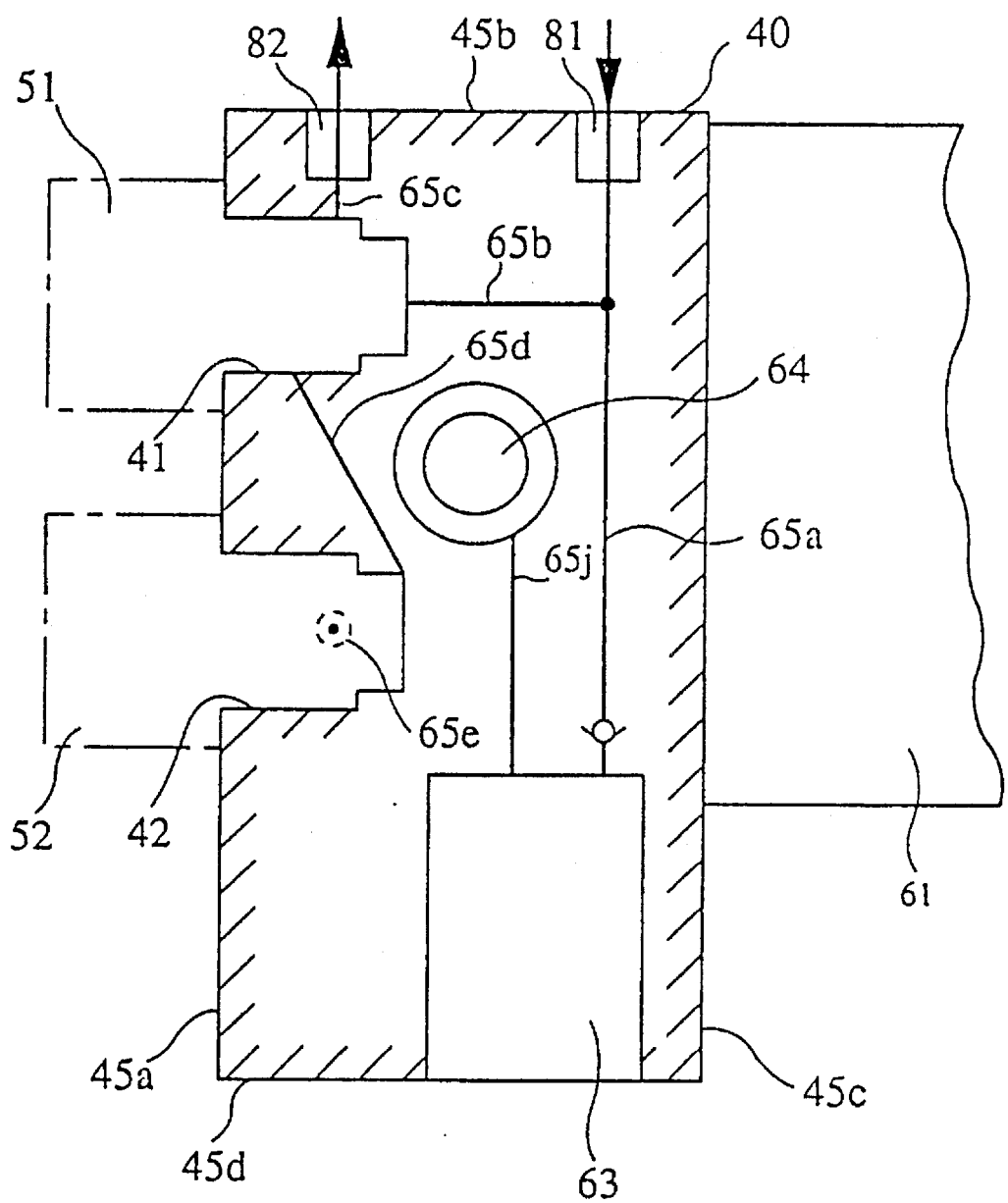
FIG. 4 is a partial cross sectional view and diagram as viewed from the side of that area of FIG. 3 along the lines N—N.
Figure 5:
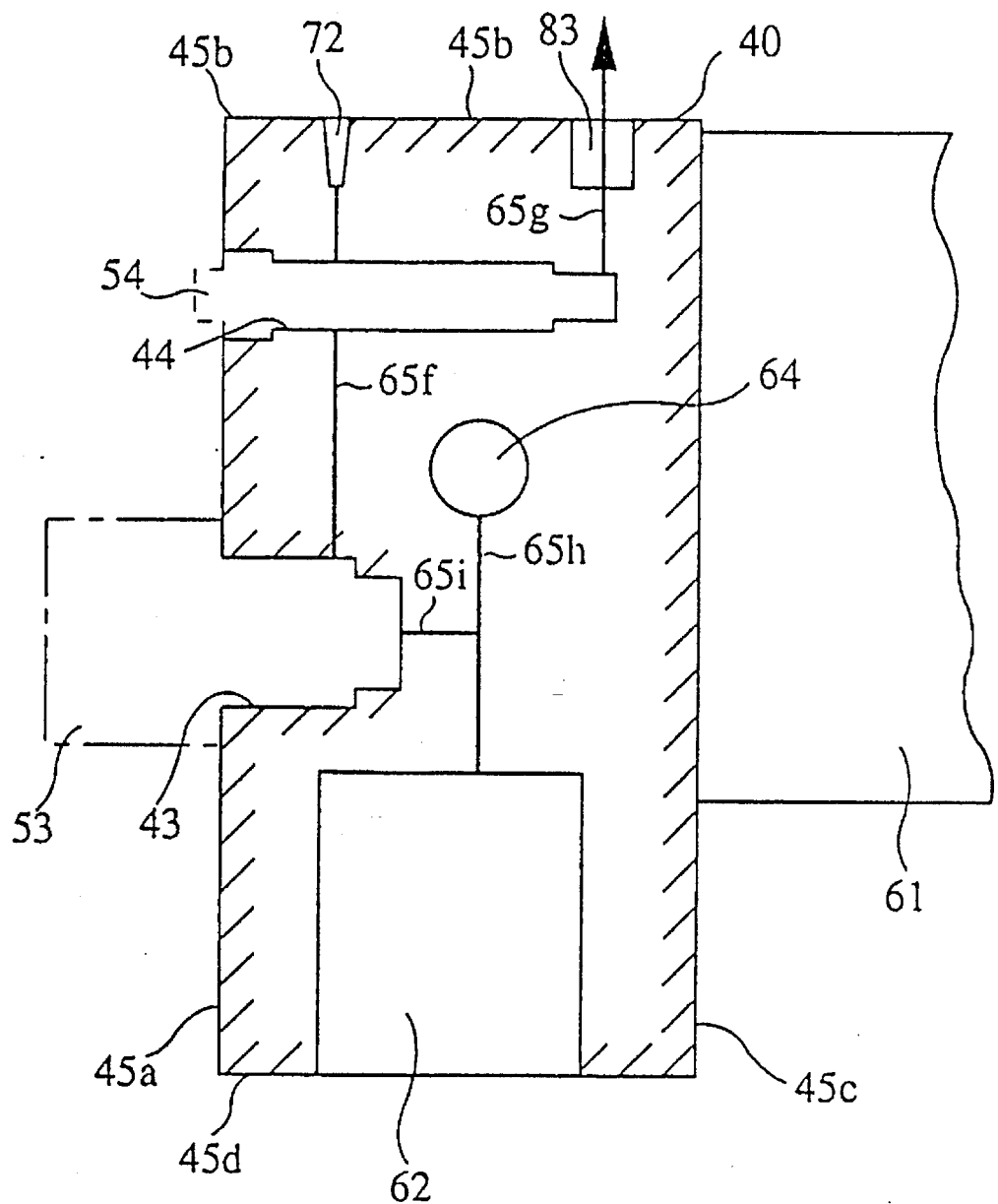
FIG. 5 is a partial cross sectional view and diagram as viewed from the side of that area of FIG. 3 along the lines V—V.

FIG. 3 shows in cross section the right half of the symmetrical housing 40, wherein a normally-open inlet solenoid valve 51 is mounted in the upper, outer mounting bore 41, a normally-open selector solenoid valve 52 is mounted in the lower, outer mounting bore 42, a normally-closed outlet solenoid valve 53 is mounted in the lower, inner mounting bore 43, and a pressure control valve 54 is mounted in the upper, inner mounting bore 44.

In the bottom segment of the housing 40, a reservoir 62 and dumping chamber 63 are formed from bores made upwardly from the bottom face 45d of the housing.

A pump 64 is mounted horizontally in the center of the housing 40 (midway between the solenoid valves mounted in the lower and upper mounting bores). The pump 64 is driven by the rotational force received from the motor 61, that is shown in FIG. 2, is mounted on the rear face 45c of the housing 40 at right angles to the pump 64.

Brake fluid lines are made within the housing 40 as follows. As viewed from the front face, these brake fluid lines are also formed symmetrically about the vertical center of the housing, hence only those lines on the right half of the housing will be explained.

First vertical duct 65a is bored vertically from the inlet port 81 on the upper face 45b of the housing 40 to provide a passageway to the dumping chamber 62. Second vertical duct 65c is bored vertically from the outlet port 82 on the upper face 45b to provide a passageway to the valve mounting bore 41. Third vertical duct 65d is bored diagonally from the inner face of valve mounting bore 41 to provide a passageway to the rear end of valve mounting bore 42 positioned below bore 41.

Fourth vertical duct 65f is bored vertically from the upper face 45b to valve mounting bore 44 then continues further to valve mounting bore 43 directly below to provide a passageway between the two bores. The opening of the fourth vertical duct 65f is closed with a blank cap 72. Fifth vertical duct 65g is bored vertically from the outlet port 83 on the upper face 45b to provide a passageway to the rear end of valve mounting bore 44. Sixth vertical duct 65h is bored vertically from reservoir 62 in the direction of the upper face 45b and provides a passageway between the reservoir 62 and the pump 64. Seventh vertical duct 65j is bored vertically from the dumping chamber 63 in the direction of the upper face 45b, and provides a passageway between the dumping chamber 63 and the pump 64.

In addition, first horizontal duct 65b is bored horizontally from valve mounting bore 41 in the direction of the rear face 45c to provide a passageway between valve mounting bore 41 and first vertical duct 65a. Second horizontal duct 65e is bored horizontally from the right face 45e of the housing 40 to valve mounting bore 42 then continues to valve mounting bore 43 to provide a passageway between the two bores. The opening of second horizontal duct 65e is closed by a blank cap 71. Third horizontal duct 65i is bored horizontally from valve mounting bore 43 in the direction of the rear face 45c to provide a passageway to sixth vertical duct 65h.

The pressure control valves 54, 54 are hydraulically-actuated normally-open valves that act to reduce the brake pressure of the rear wheel brakes in response to the front wheel brake pressure, thereby preventing the rear Wheels from locking before the front brakes. The pressure control valves are set within the stepped diameter valve mounting bores 44, 44 bored within the housing 40.

Figure 6:
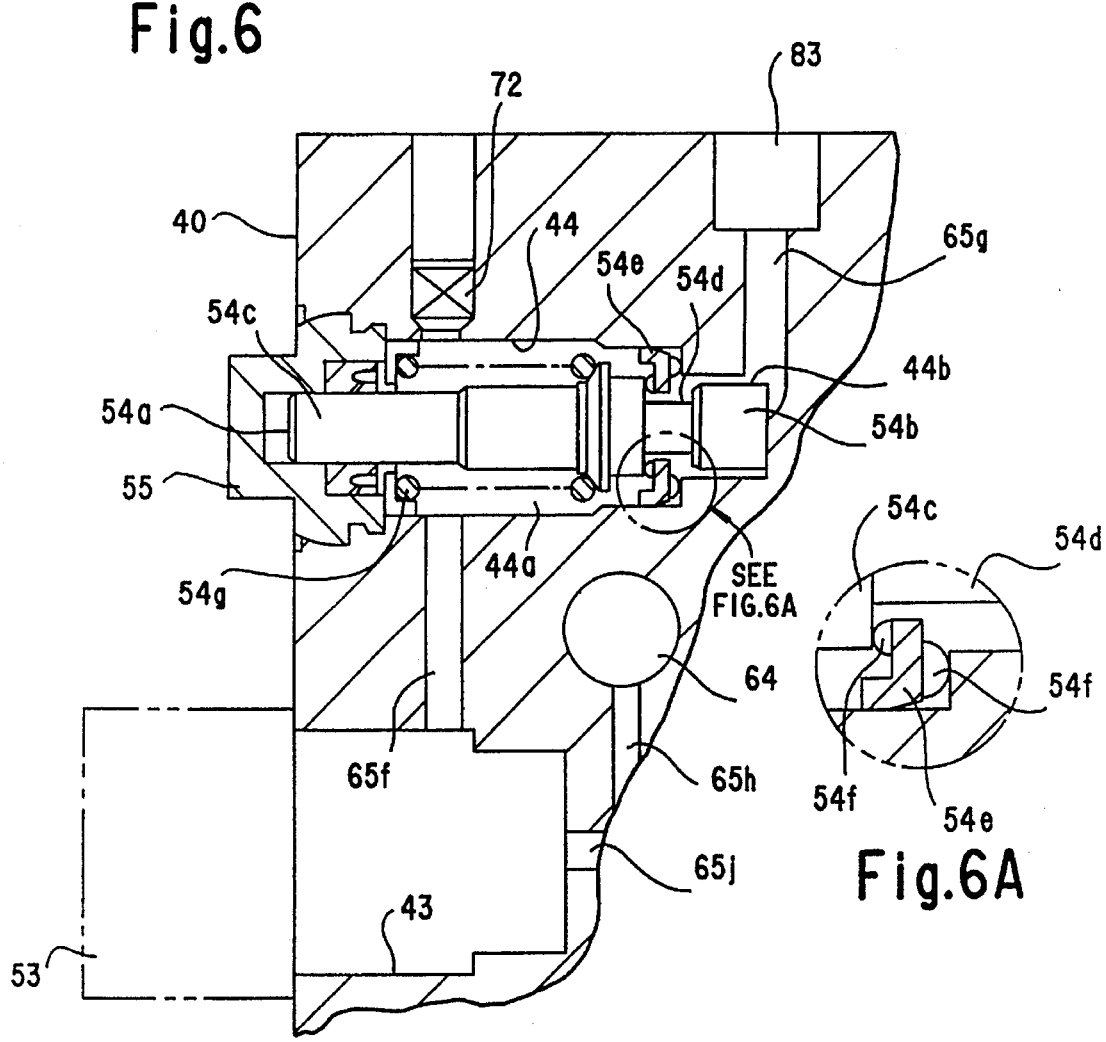
FIG. 6 is a partial cross sectional view showing a pressure control valve.

FIG. 6 illustrates one example of a pressure control valve 54. The piston 54a housed within the valve mounting bore 44 comprises a head 54b, as shown on the right side of the diagram, and a small-diameter neck 54d separating the head from the body 54c. A lip seal 54e, L-shaped in cross section, is mounted around the exterior of the neck 54d. The set position of the lip seal 54e forms the boundary to divide the interior of valve mounting bore 44 into two portions: chamber 44a that has a passageway to the valve mounting bore 43 into which solenoid valve 53 is set, and chamber 44b that has a passageway to the outlet port 83. A protrusion 54f is molded on both sides of the lip seal 54e, wherein the protrusion 54f molded on the side face of that side facing chamber 44a abuts against the edge formed where,the neck 54d meets the body 54c, and provides a passageway between chamber 44a and chamber 44b. A spring 54g compressed between the blank cap 55 which closes the opening of valve mounting bore 44 and piston 54a urges the piston 54a in the direction towards chamber 44b.

The side face of the lip seal 54e facing the head 54b of piston 54a and the end face of the head 54b form a valve arrangement, wherein should the pressure acting on piston 54a reach a specified value, then piston 54a slides toward the left (of the diagram) to close the brake fluid line. Subsequently, the valve arrangement opens and closes to increase the pressure in chamber 44b in an amount equal to the reduction in pressure in this chamber when the pressure in chamber 44a rises.

The lip seal 54e itself also forms a one-way valve that only allows fluid to flow around its exterior circumference from chamber 44b to chamber 44a.

The configuration and action of this pressure control valve 54 has been publicly-disclosed and thus a detailed explanation of its action is omitted here.

EXAMPLE 2

Figure 7:
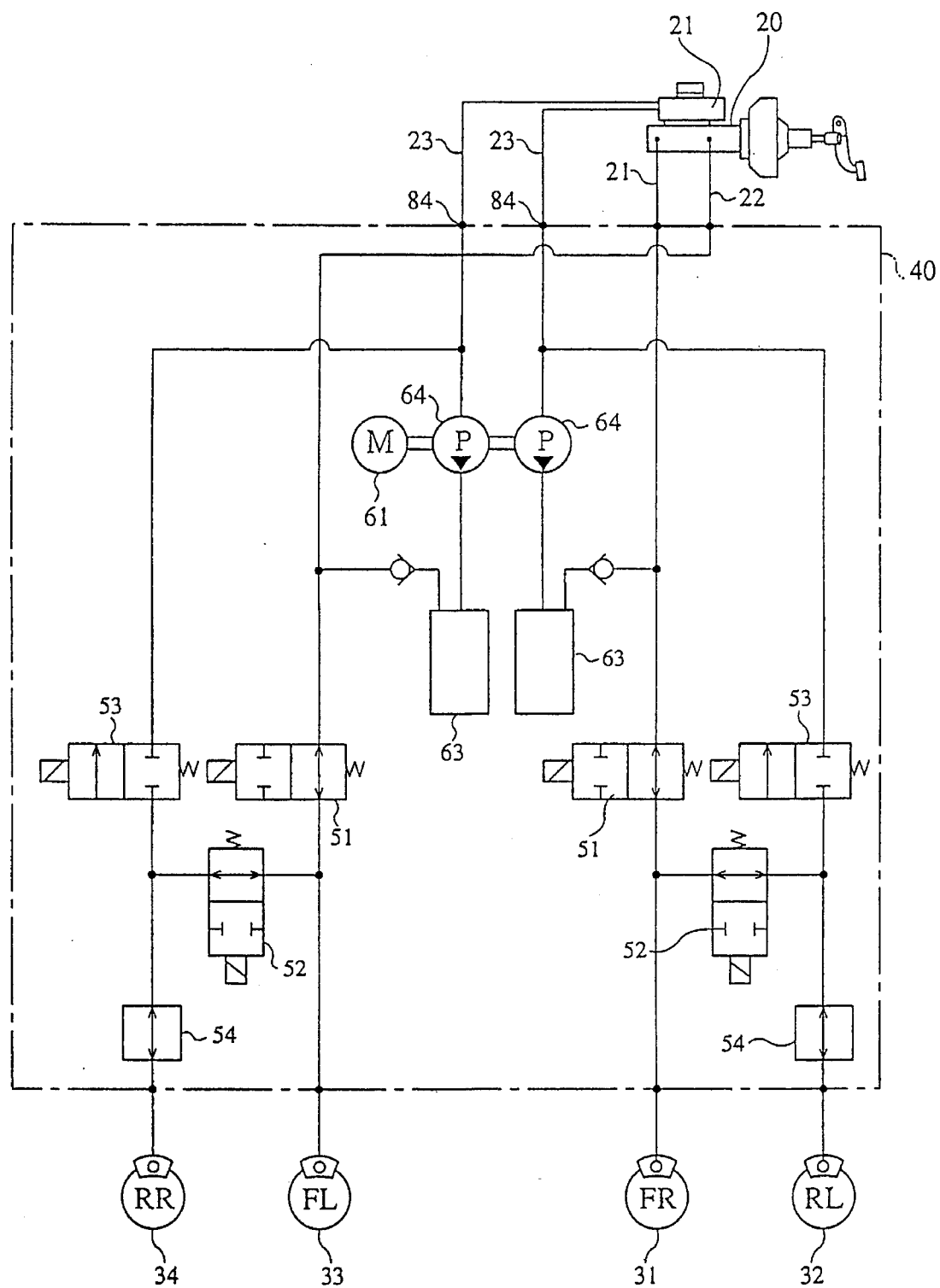
FIG. 7 is a diagram of a brake circuit with installed antilock brake device as embodied in Example 2 of the present invention.
Figure 8:
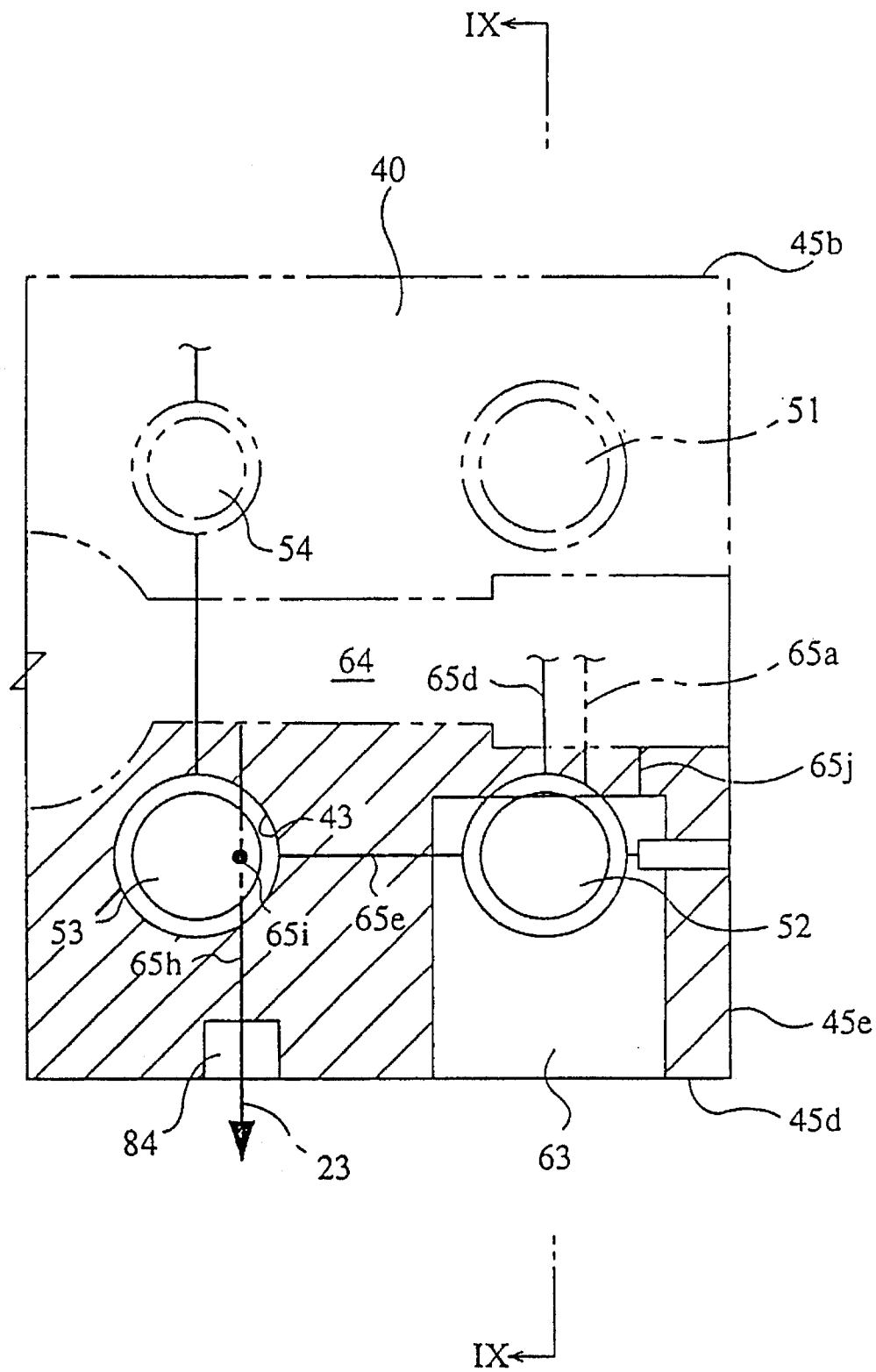
FIG. 8 is a partial cross sectional view and diagram of the front face of the housing of the antilock brake device of this invention as embodied in Example 2.
Figure 9:
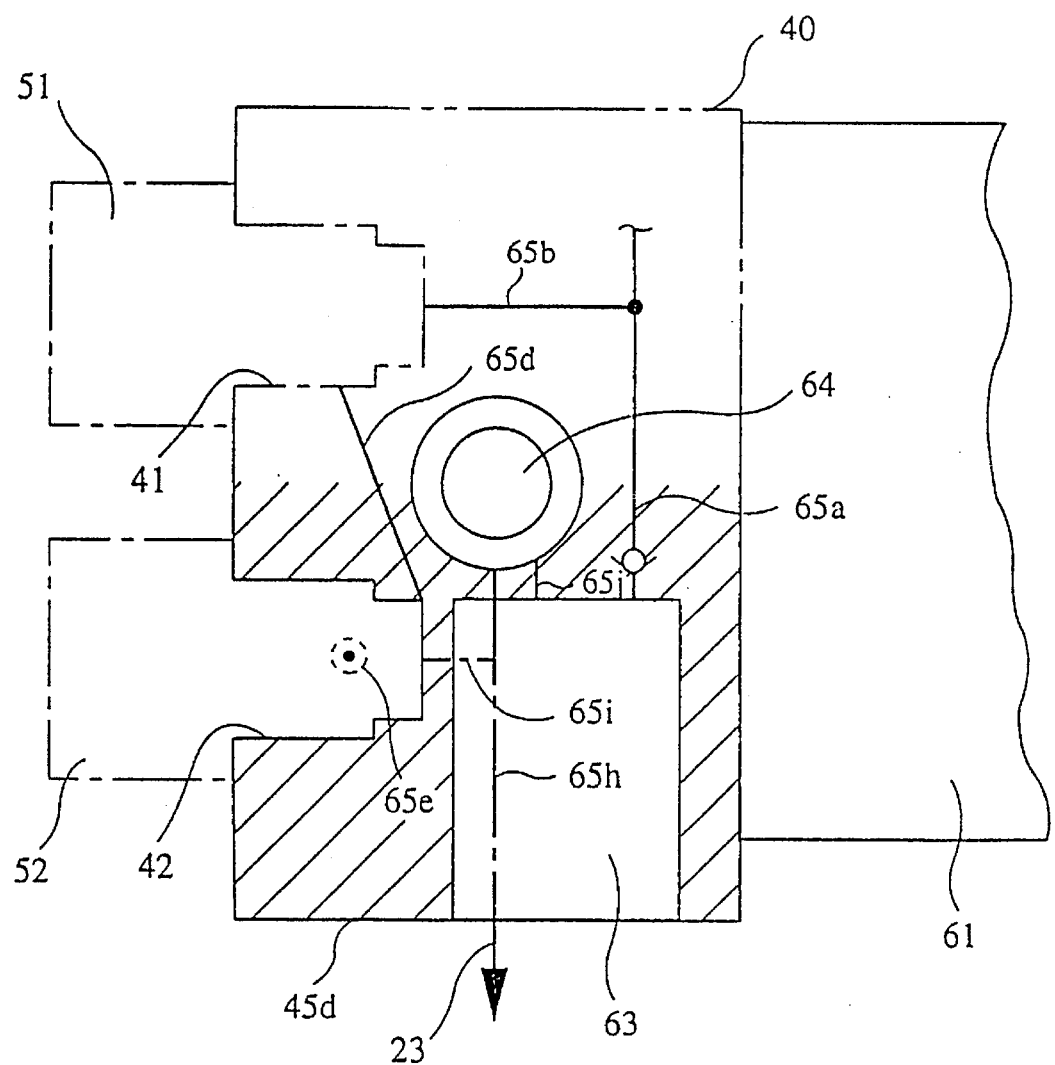
FIG. 9 is a partial cross sectional view and diagram as viewed from the side of that area of FIG. 8 along the lines IX—IX.

FIGS. 7-9 illustrate another embodiment of this invention applicable to an open-circuit antilock brake system.

The configuration of this example is the same as the configuration of Example 1 except that the reservoir 62 formed inside the housing 40 has been omitted. Instead, the reservoir 21 on the side of the master cylinder 20 also functions as reservoir 62 of the prior example. A pipe 23 to connect the reservoir 21 to the housing 40 has been added.

As shown in FIG. 8, sixth vertical duct 65h with a passageway to the pump 64 has been extended to the bottom face 45d of the housing 40, and an outlet port 84 has been made on that end of the sixth vertical duct 65h exposed therein.

Since no space is required within the housing 40 for a reservoir, the height of the housing in this embodiment of the invention can be less than that in Example 1.

EXAMPLE 3

Figure 10:
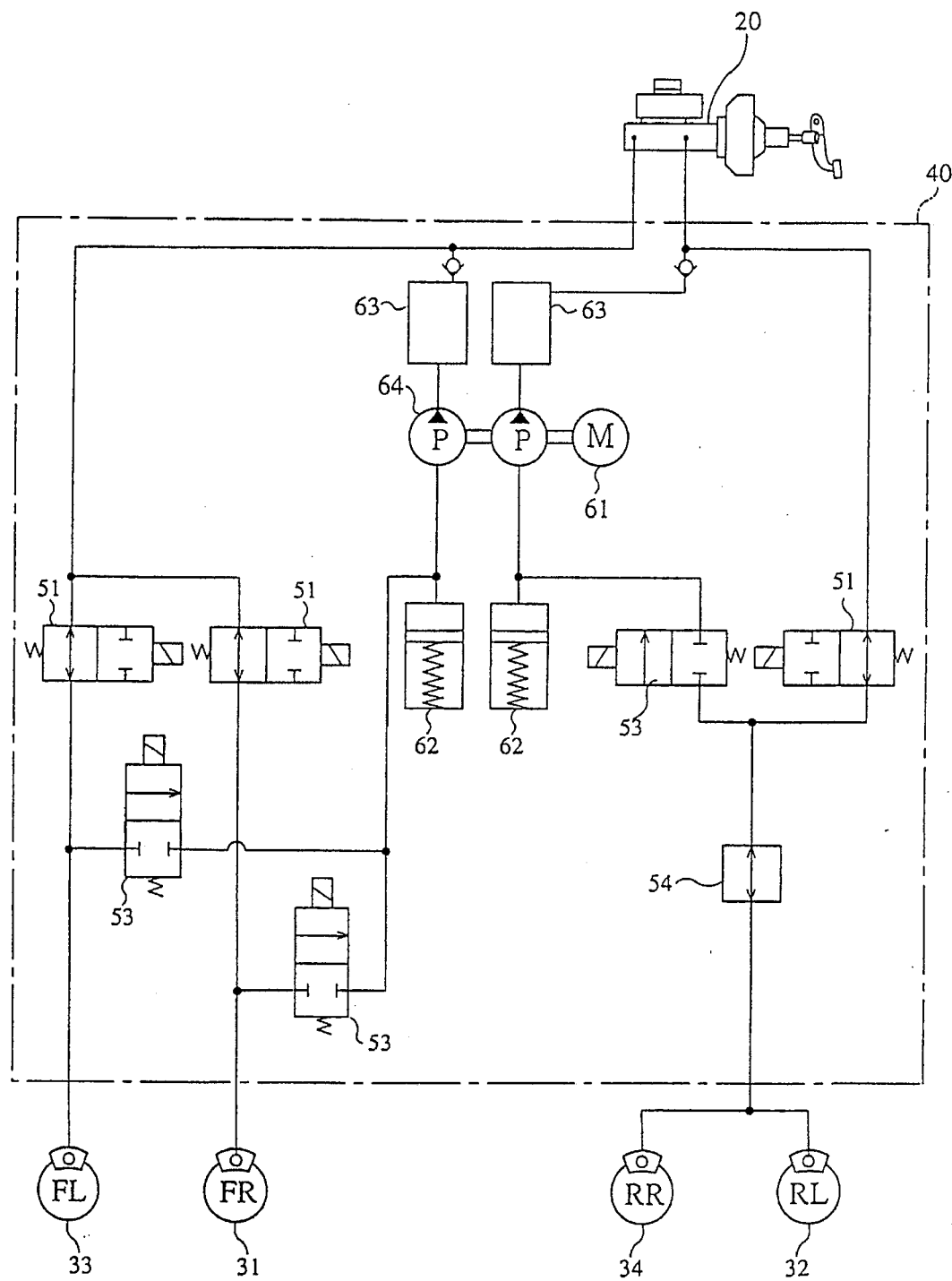
FIG. 10 is a diagram of a brake circuit with installed antilock brake device as embodied in Example 3 of the present invention.
Figure 11:
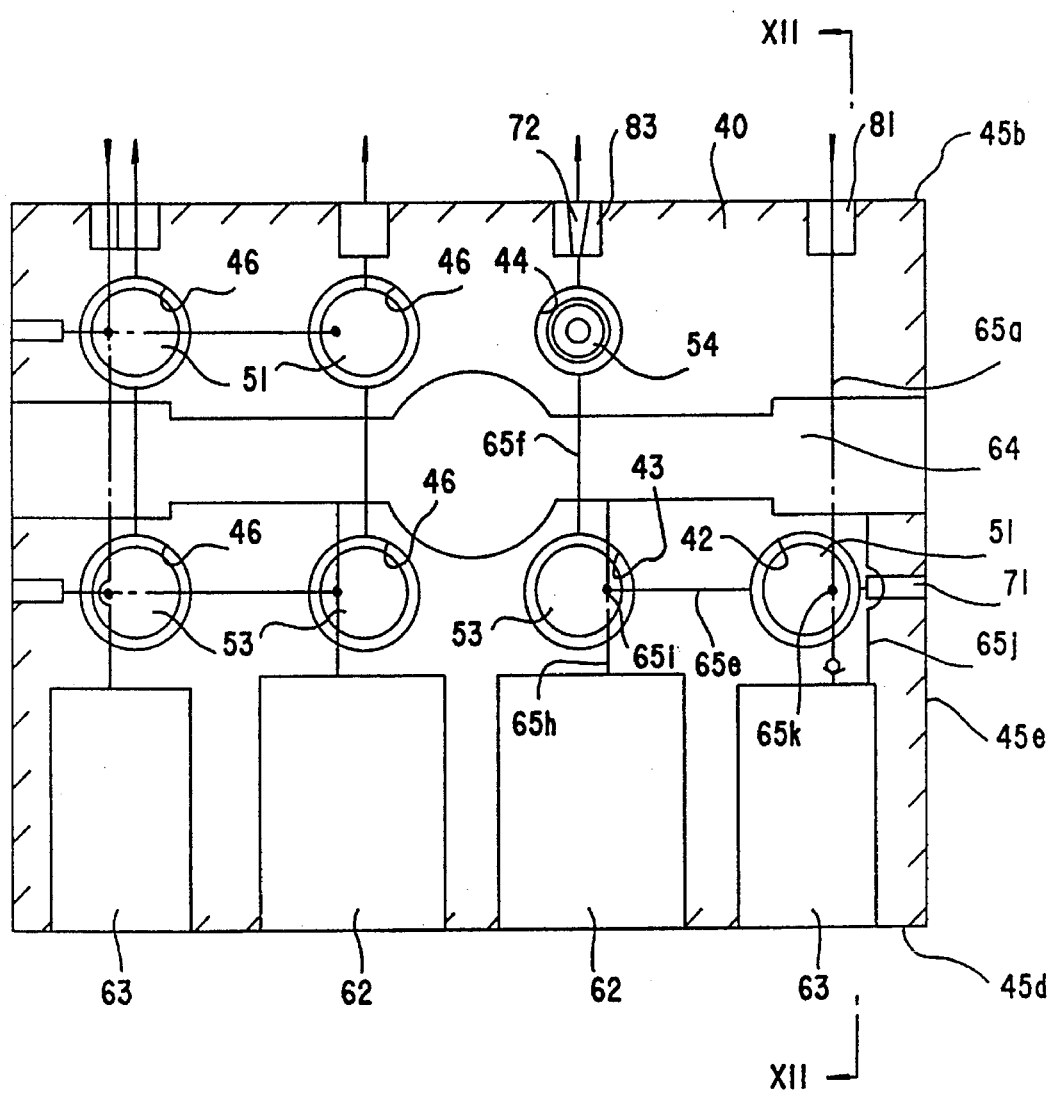
FIG. 11 is a partial cross sectional view and diagram of the front face of the housing of the antilock brake device of this invention as embodied in Example 3.
Figure 12:
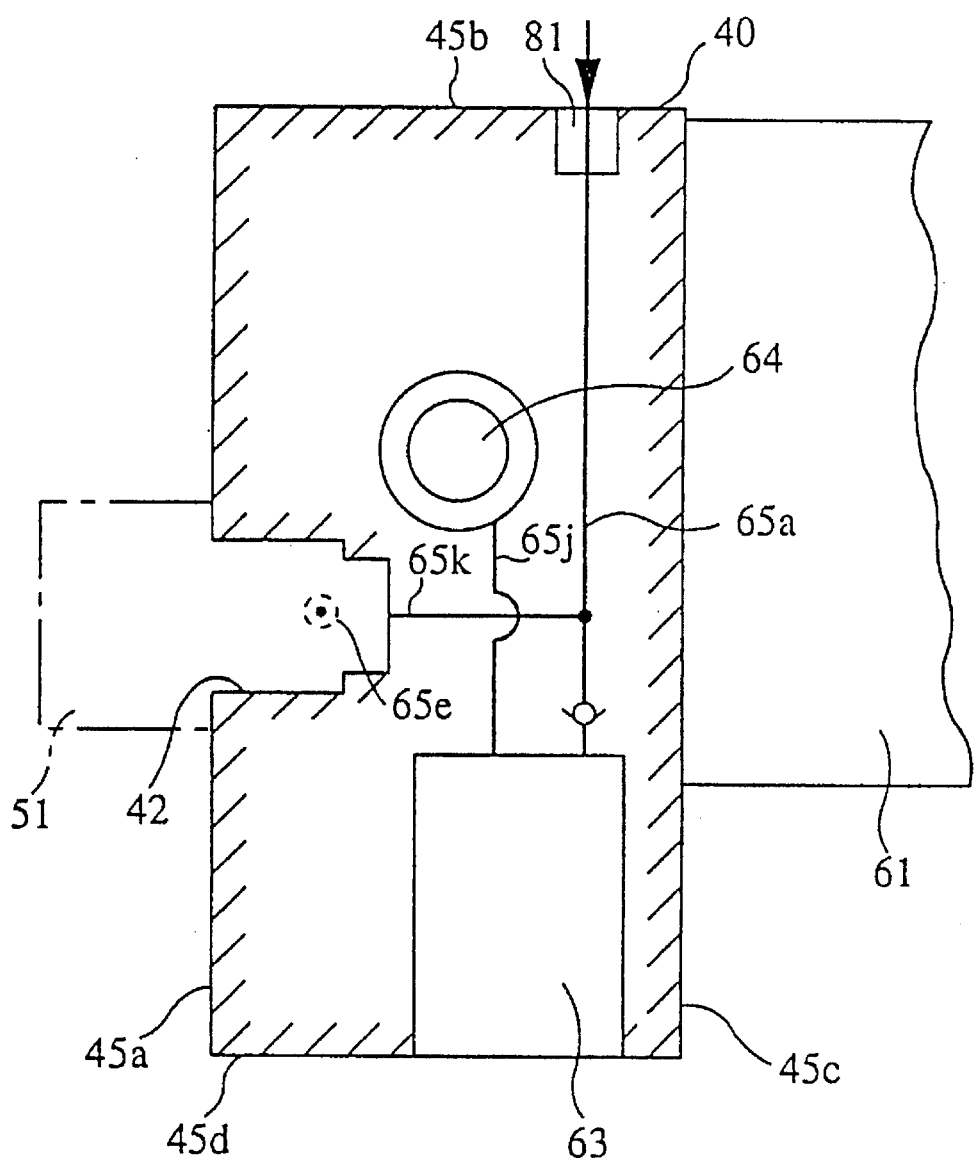
FIG. 12 is a partial cross sectional view and diagram as viewed from the side of that area of FIG. 11 along the lines XII—XII.

FIGS. 10–12 illustrate an example of this invention applicable to a closed circuit brake system comprised of a two-line front brakes and rear brakes circuit.

In this embodiment, two combinations of an inlet solenoid valve 51 and outlet solenoid valve 53 are incorporated into the front wheels circuit and one combination is incorporated into the rear wheels circuit. One pressure control valve 54 is incorporated into the rear wheels circuit only. Seven valve mounting bores are formed on the front face 45a of the housing 40 with three bores 44, 46, 46 on the upper row and four bores 43, 43, 46, 46 on the bottom row. As viewed from the front face 45a, the two inlet solenoid valves 51, 51 and the two outlet solenoid valves 53, 53 are mounted in the two upper and two lower valve mounting bores 46, 46, 46, 46 respectively on the left side for the housing to control the front wheel brakes 31, 33.

Also as viewed from the front face 45a, an inlet solenoid valve 51 and outlet solenoid valve 53 are mounted in the housing bores 42, 43 respectively on the lower right half of the housing in order to control the rear wheel brakes 32, 34. A pressure control valve 54 is mounted in valve mounting bore 44 on the upper, right half of the housing.

The brake fluid lines in the left half of the housing 40 are arranged in the same manner as in the prior examples and an explanation is therefore omitted; only the arrangement of fluid lines in the right side of the housing will be explained in detail below. The arrangement of the reservoir 62, dumping chamber 63, and pump 64 is the same as in Example 1.

In this embodiment, first horizontal duct 65b, second vertical duct 65c, and third vertical duct 65d as designed in Example 1 are not required, but another fluid line, fifth horizontal duct 65k has been added. This fifth horizontal duct is bored horizontally from valve mounting bore 42 in the direction of the rear face 45c to provide a passageway with first vertical duct 65a.

The design as described in this example enables an antilock brake device housing a pressure control valve for a two-line front brakes circuit and rear brakes circuit to be fabricated with only very slight changes to the same housing used for a two-line diagonal brake circuit as embodied in Example 1.

EXAMPLE 4

Figure 13:
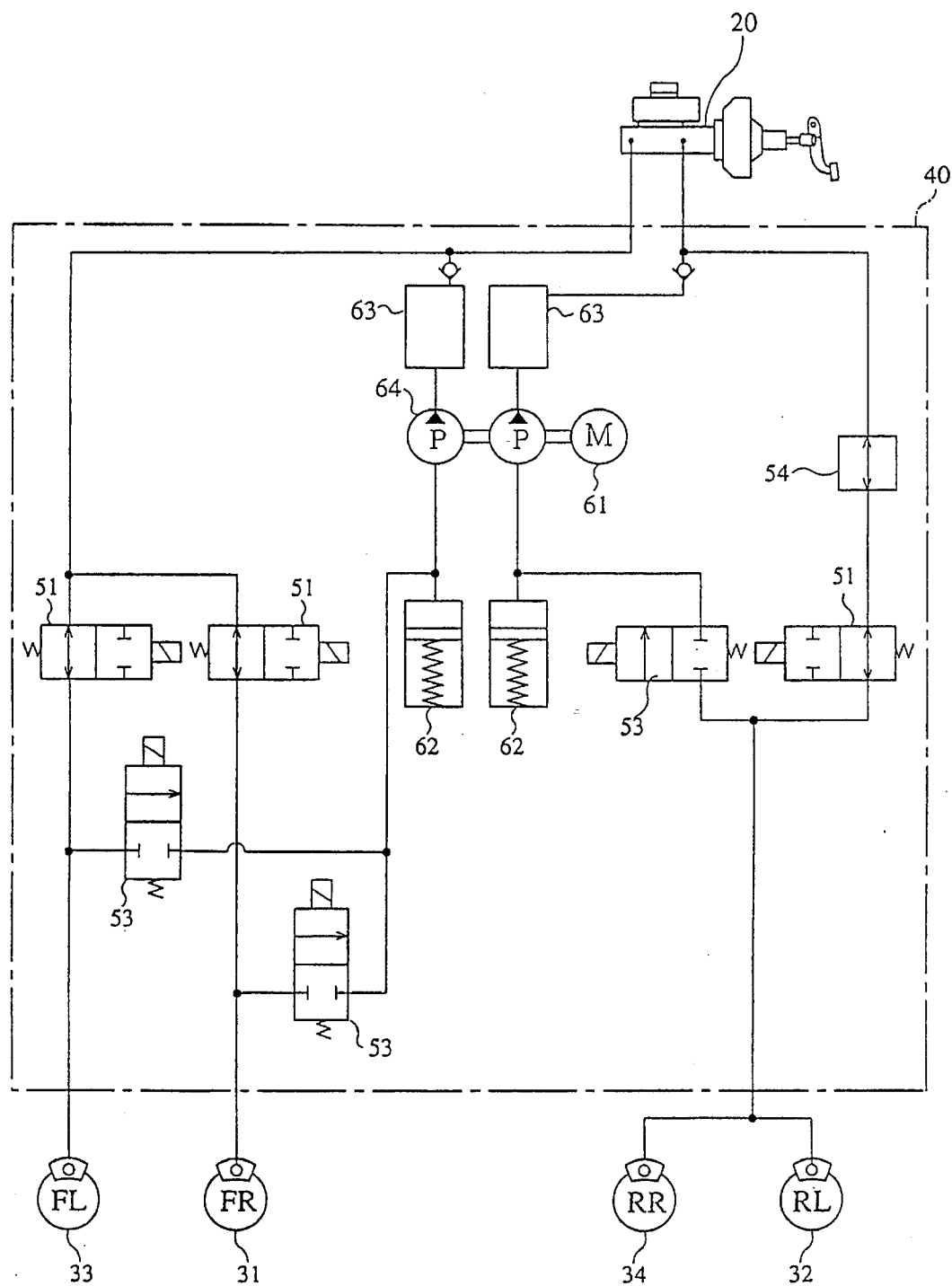
FIG. 13 is a diagram of a brake circuit with installed antilock brake device as embodied in Example 4 of the present invention.

FIG. 13 illustrates another embodiment of the antilock brake device of this invention that is applicable to a two-line front brakes and rear brakes circuit. Whereas in Example 3, the pressure control valve was positioned between the outlet solenoid valve and the outlet port to the rear wheel brake, here the pressure control valve is positioned between the inlet solenoid valve and the inlet port from the master cylinder.

Figure 14:
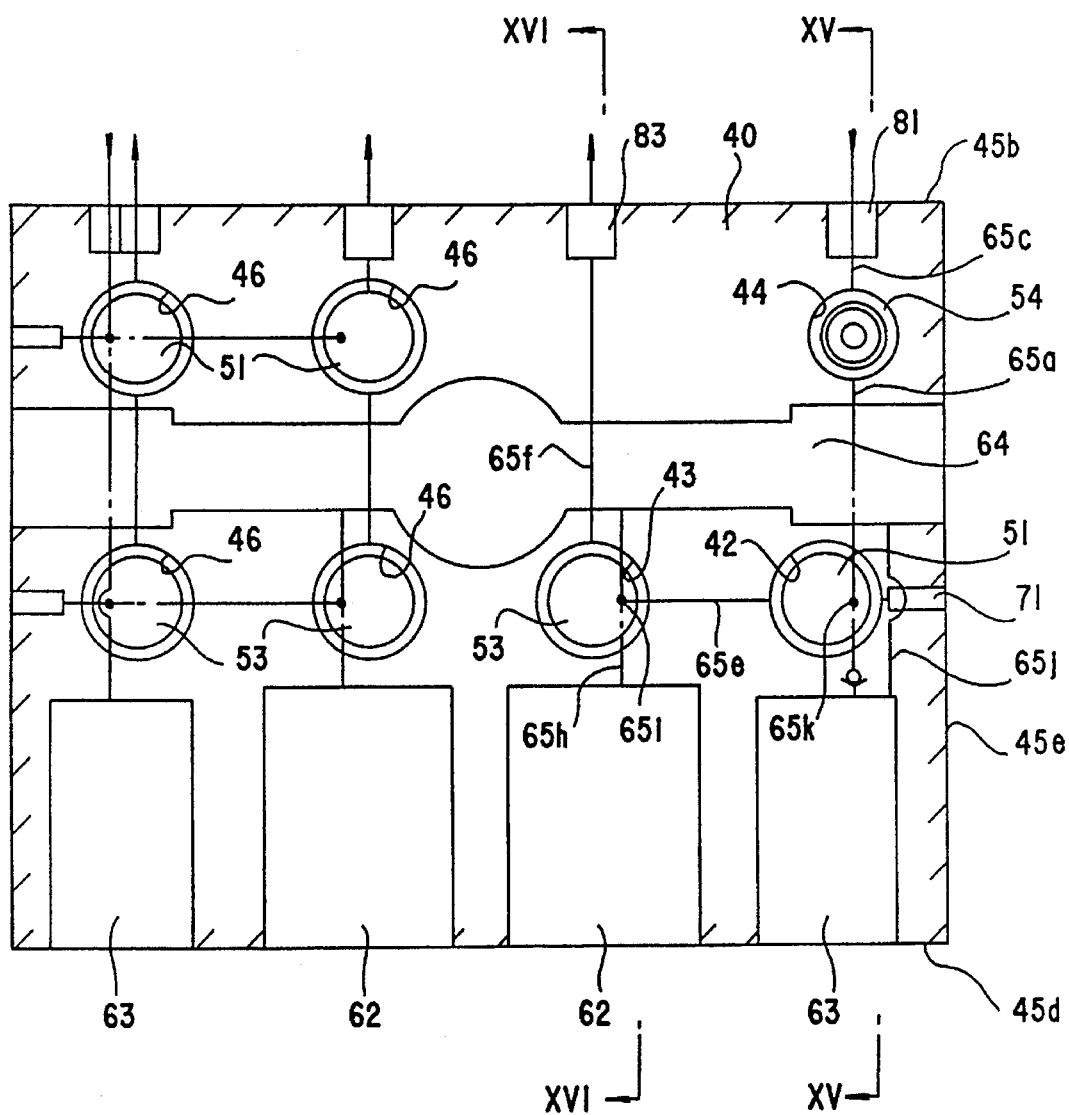
FIG. 14 is a partial cross sectional view and diagram of the front face of the housing of the antilock brake device of this invention as embodied in Example 4.
Figure 15:
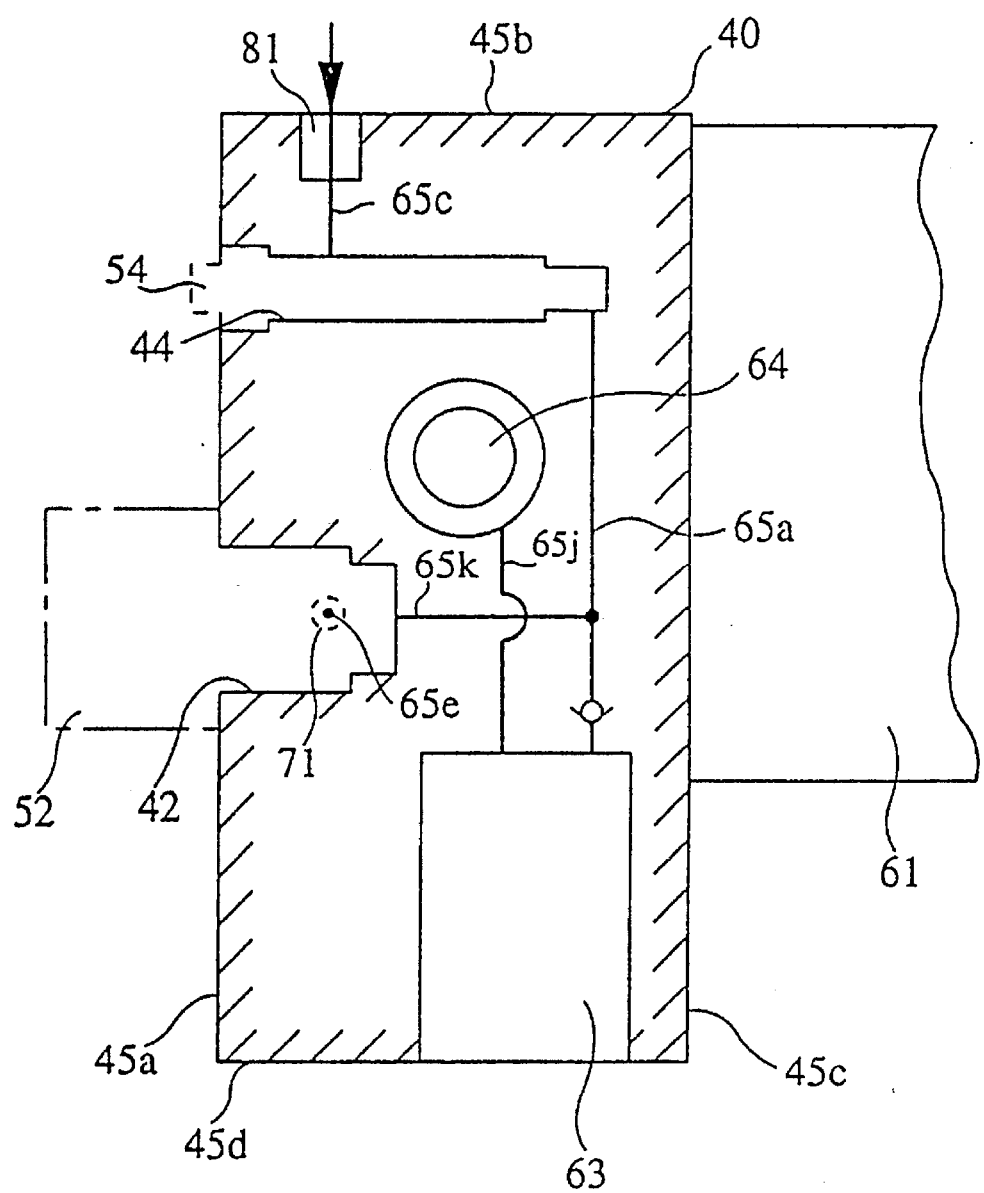
FIG. 15 is a partial cross sectional view and diagram as viewed from the side of that area of FIG. 14 along the lines XV—XV.
Figure 16:
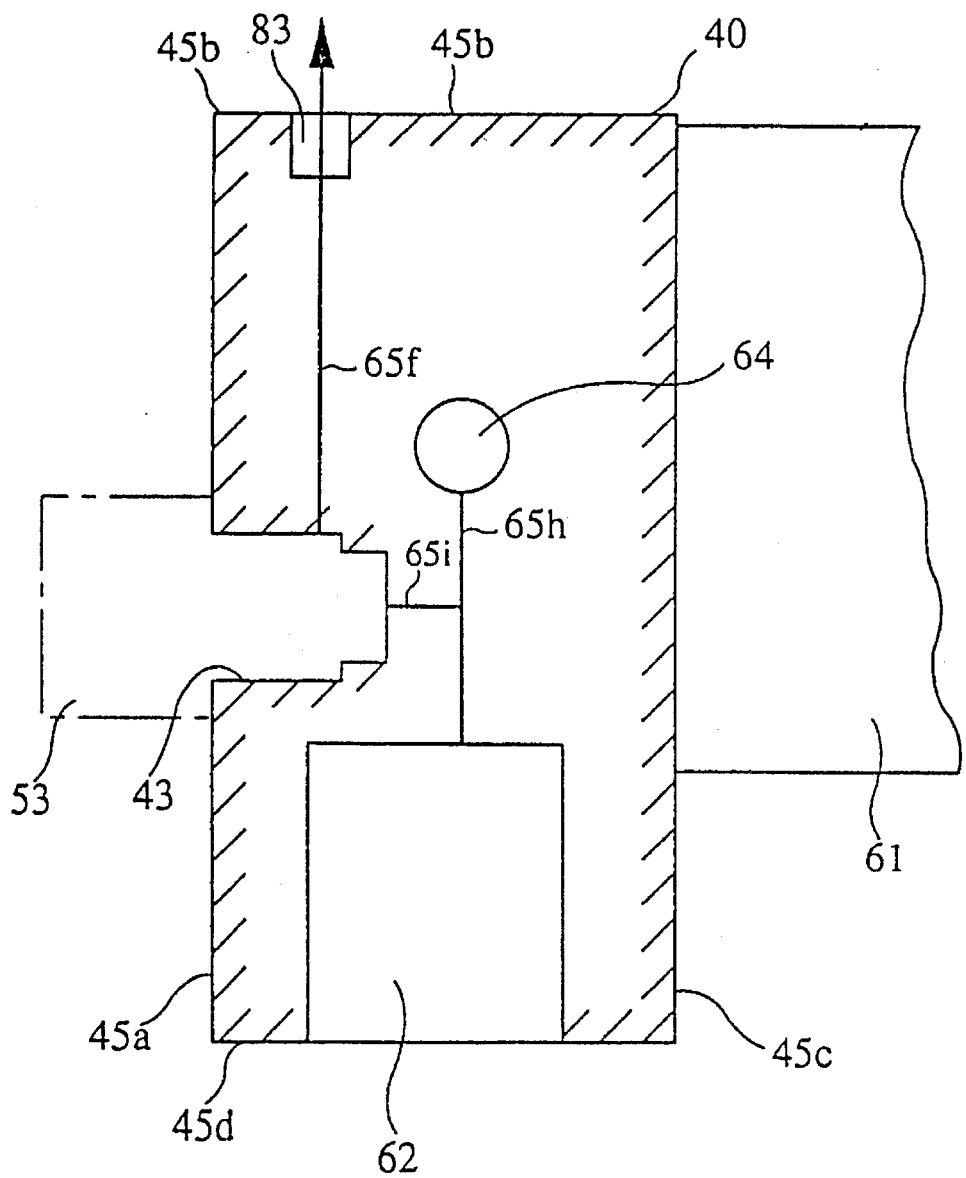
FIG. 16 is a partial cross sectional view and diagram as viewed from the side of that area of FIG. 14 along the lines XVI—XVI.

As shown in FIG. 14, in this embodiment the position of valve mounting bore 44, in the housing 40 has been changed from that of Example 3, and is bored from the upper, outer side of the front face 45a in the direction of the rear face 45c. Also as shown in FIG. 15, first vertical duct 65a is bored vertically from the dumping chamber 63 in the direction of the upper face 45b to provide passage to valve mounting bore 44. The horizontal duct 65k is bored horizontally from the valve mounting bore 42 in the direction of the rear face 45c to provide a passageway to the first vertical duct 65a. Second vertical duct 65c is bored vertically from the upper face 45b in the direction of the bottom face 45d to provide a passageway to the valve mounting bore 44.

Also, in this example, first horizontal duct 65*b* and third vertical duct 65*d* as present in Example 1 are not required, but another fluid line, a fifth horizontal duct 65*k* has been added.

With the design as described in this example, the position of the pressure control valve 54 can be readily changed by only slight changes in the boring positions of the housing bores and in the fabrication of the brake fluid lines.

EXAMPLE 5

Figure 17:
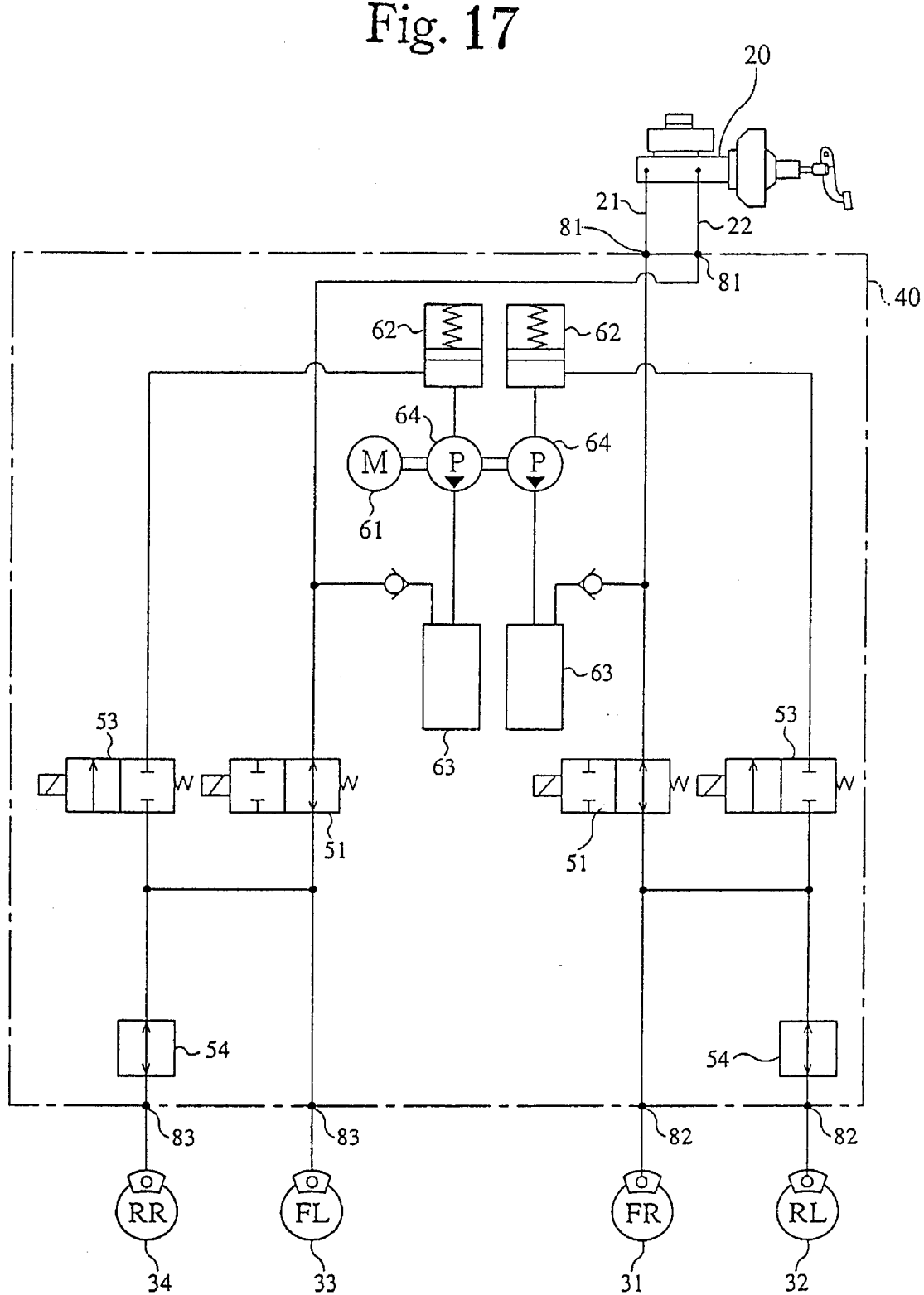
FIG. 17 is a diagram of a brake circuit with installed antilock brake device as embodied in Example 5 of the present invention.

FIG. 17 illustrates another embodiment of this invention applicable to a two-line diagonal brake circuit. As shown in the diagram, the selector solenoid valve 52 installed in Example 1 between the inlet solenoid valve 51 and outlet solenoid valve 53 has been omitted.

Figure 18:
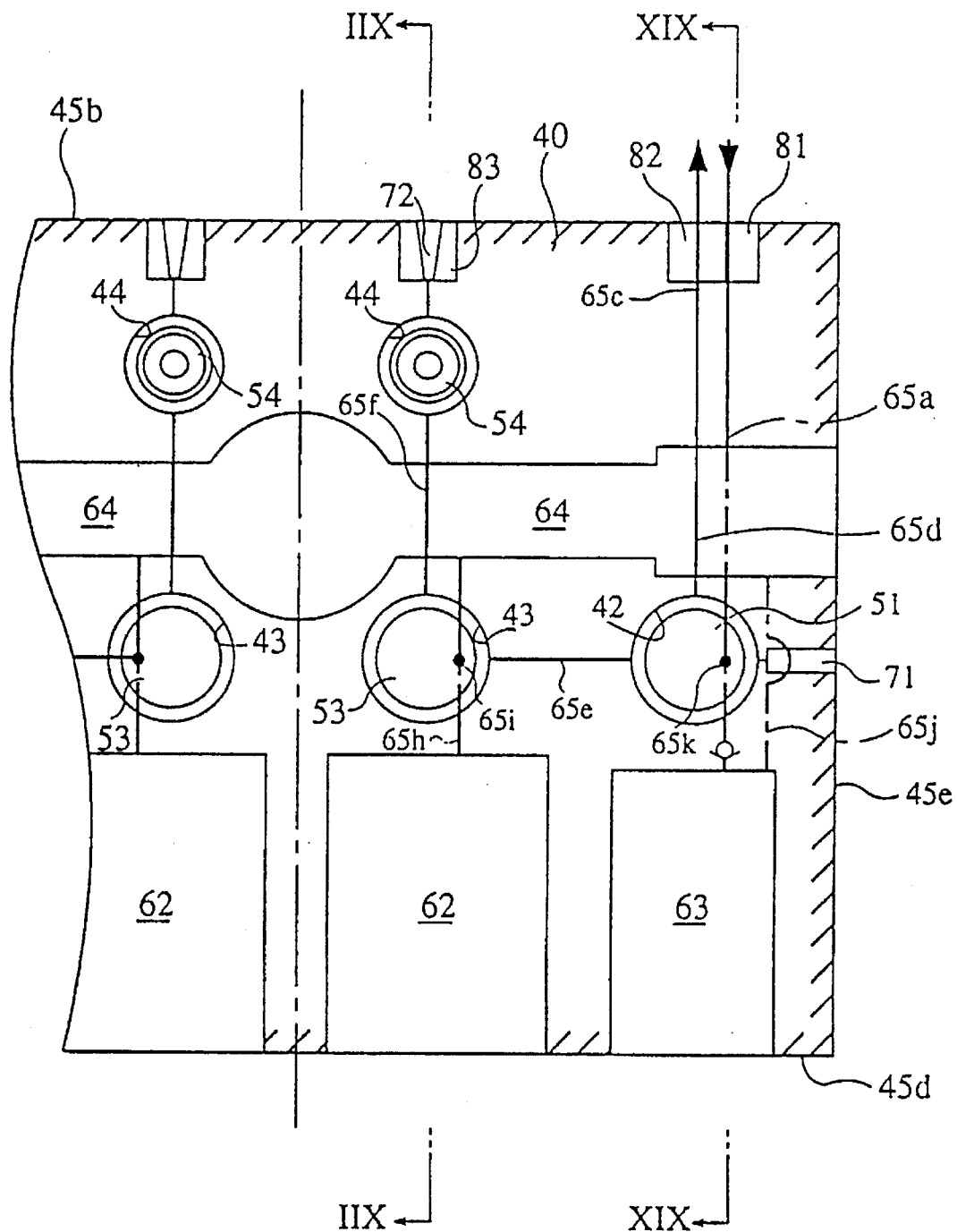
FIG. 18 is a partial cross sectional view and diagram of the front face of the housing of the antilock brake device of this invention as embodied in Example 5.
Figure 19:
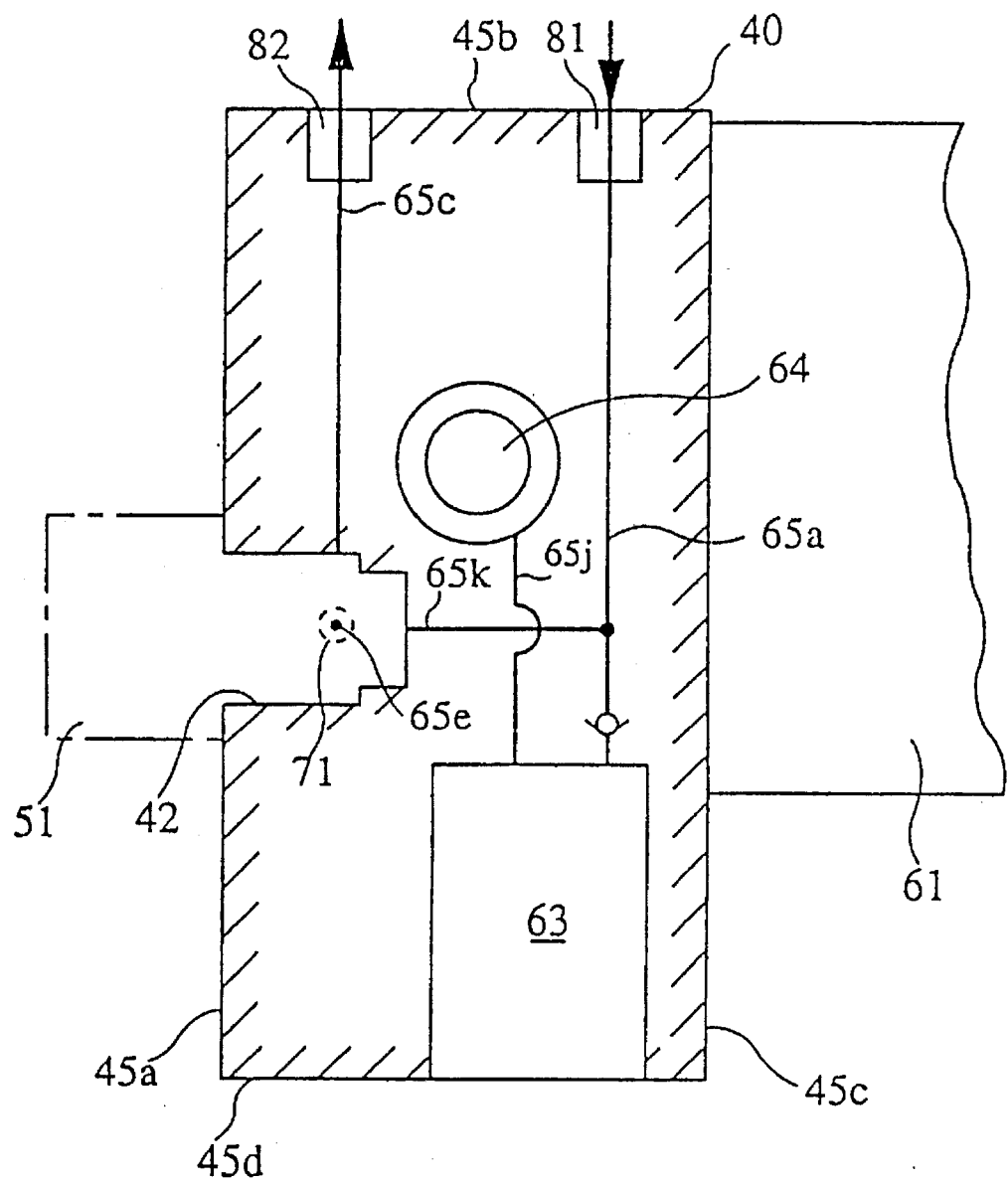
FIG. 19 is a partial cross sectional view and diagram as viewed from the side of that area of FIG. 18 along the lines XIX—XIX.
Figure 20:
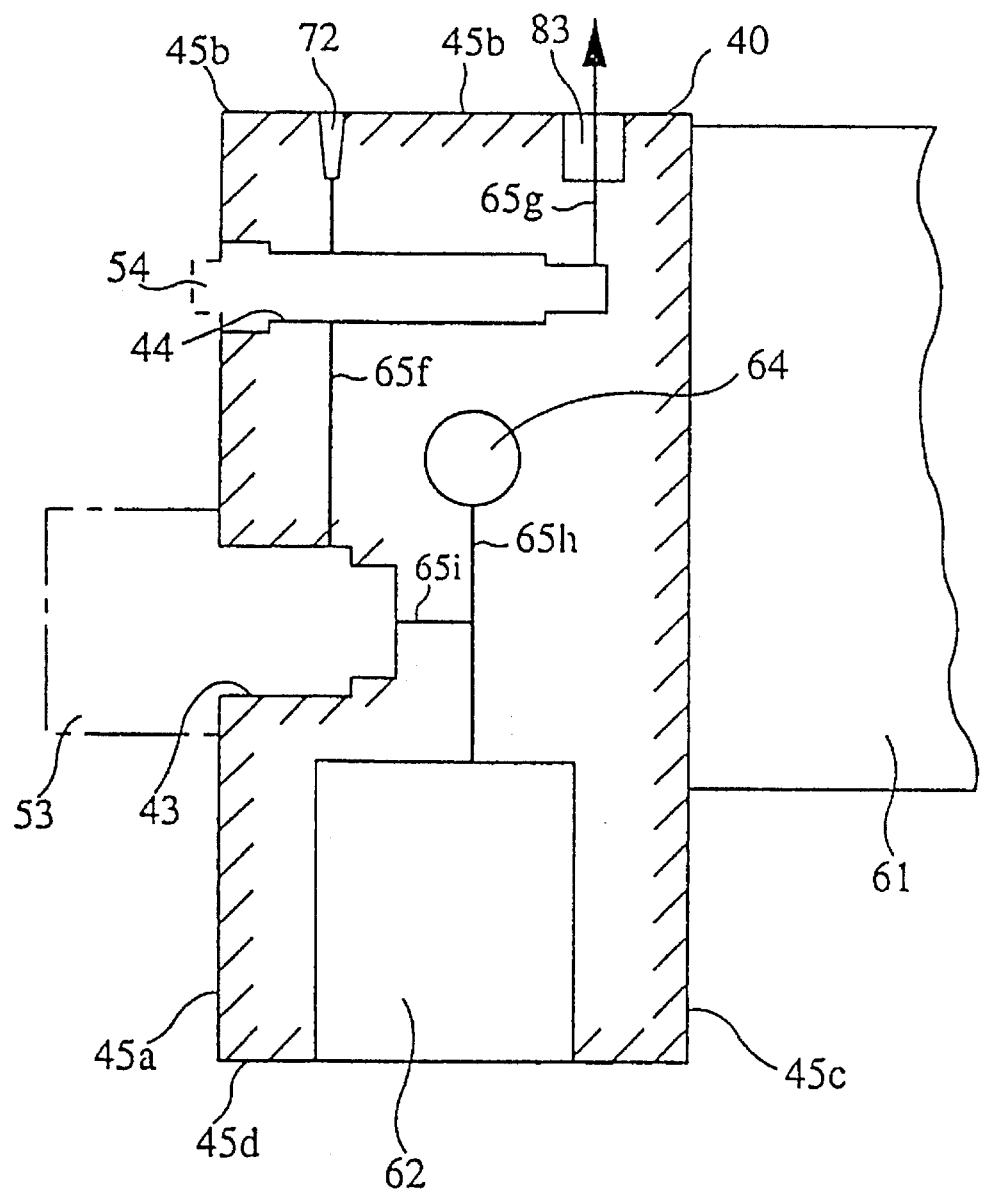
FIG. 20 is a partial cross sectional view and diagram as viewed from the side of that area of FIG. 18 along the lines XX—XX.
Figure 21:
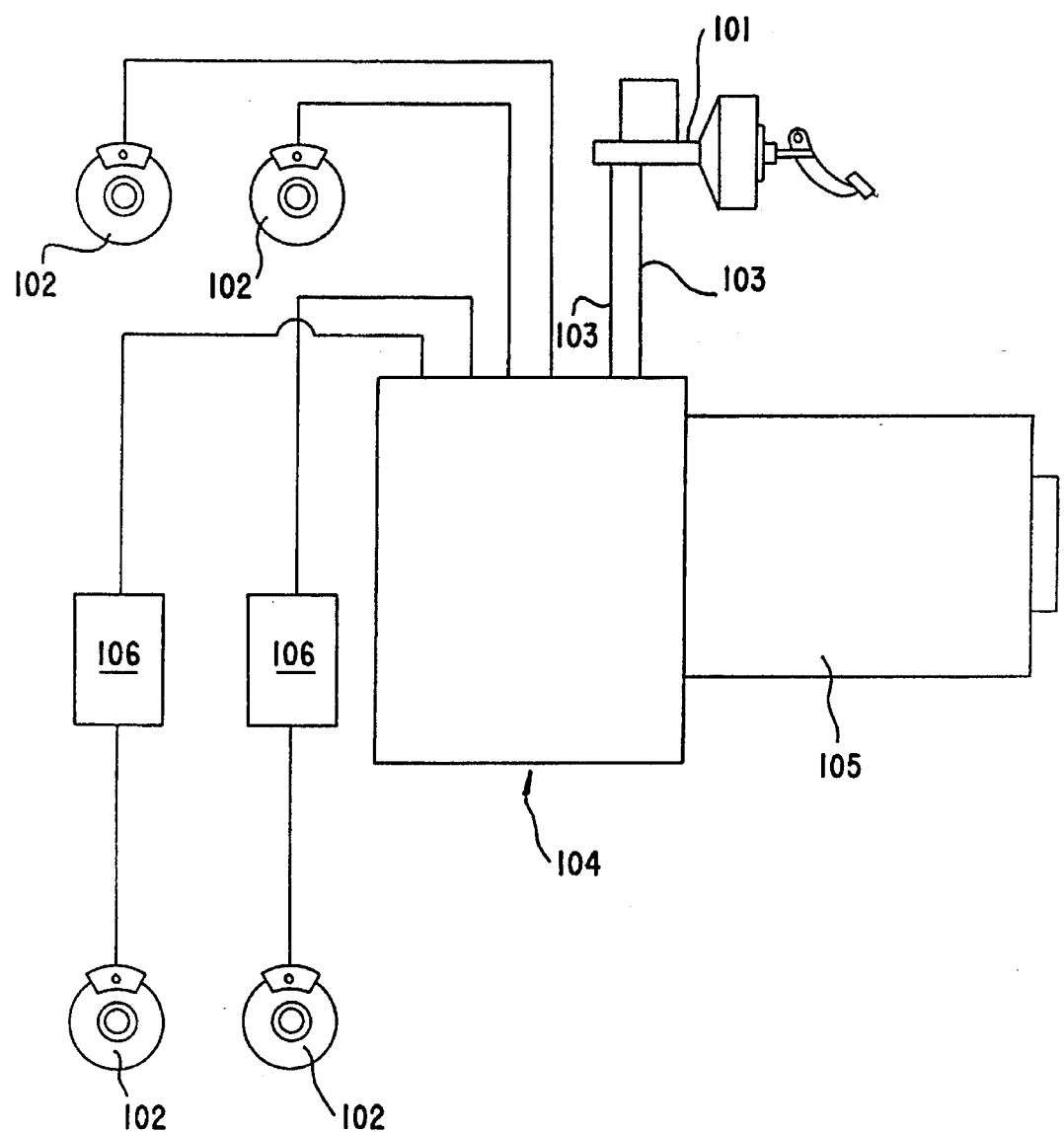
FIG. 21 is an explanatory diagram of a conventional antilock brake device.

As shown in FIGS. 18–20, in contrast to the design of the housing 40 in Example 1, in this embodiment there is no valve mounting bore 41 nor selector valve 52. In other words, the inlet solenoid valve 51 is mounted inside the valve mounting bore 42. As well, second vertical duct 65*c* is bored vertically from the upper face 45*b* in the direction of the bottom face 45*d* to provide a passageway to valve mounting bore 42. Fourth horizontal duct 65*k* is bored horizontally from valve mounting bore 42 in the direction of the rear face 45*c* to provide a passageway to first vertical duct 65*a*. Moreover, first horizontal duct 65*b* and third vertical duct 65*d* as bored in Example 1 are not required here.

With the design as described in this example, a different type of brake circuit can be readily made inside the housing 40 with only slight changes in the boring positions of the housing and in the fabrication of the brake fluid lines.

EXAMPLE 6

The position of the pressure control valve 54 is not restricted to the positions as described in Examples 1–5, and can be established in other positions.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. An antilock brake system for installation in brake lines connecting a master cylinder with wheel brakes, comprising a housing; a motor-driven pump and several solenoid valves and connecting lines thereof mounted in said housing wherein said housing has a motor disposed on one planar surface, and a maximum of eight valve mounting bores arranged in lattice-fashion on one planar surface of said housing directly opposite to the one planar surface on which said motor is disposed; valves placed inside the mounting bores wherein a longitudinal axis of the valves is parallel with that of the motor; and depending on the brake circuit configuration, plural electromagnetically-actuated valves mounted in said valve mounting bores and at least one pressure control valve, actuated by the pressure of the brake fluid within the brake lines, mounted in at least one other bore.

2. An antilock brake system as claimed in claim 1 for installation into a two-line diagonal brake circuit; wherein said plural electromagnetically-actuated valves include an inlet solenoid valve to open or close a connection between the master cylinder and a front wheel brake, a selector solenoid valve to open or close a connection between the front wheel brake and a rear wheel brake, and an outlet solenoid valve to open or close a connection between the rear wheel brake and a reservoir mounted for each circuit in six of the valve mounting bores in the housing, and at least one pressure control valve to control the pressure of the rear wheel brake, mounted for each circuit in two of the valve mounting bores bored in the housing between an outlet port of the rear wheel brake and a junction between a fluid line leading to the outlet solenoid valve and a fluid line leading to the selector solenoid valve.

3. A antilock brake device as claimed in claim 1 for installation into a two-line front brakes and rear brakes circuit; wherein said plural electromagnetically-actuated valves include two combinations of an inlet solenoid valve and outlet solenoid valve mounted for the front brakes circuit and one combination of an inlet solenoid valve and outlet solenoid valve mounted for the rear brakes circuit in six of the valve mounting bores bored into the housing and said at least one pressure control valve is a pressure control valve to control the pressure of the rear wheel brakes mounted for the rear brakes circuit in one valve mounting bore between an outlet port to the rear wheel brakes and the outlet solenoid valve of the rear wheel brakes.

4. An antilock brake device as claimed in claim 1 for installation into a two-line front brakes and rear brakes circuit, wherein said plural electromagnetically-actuated valves include two combinations of an inlet solenoid valve and outlet solenoid valve mounted for the front brakes circuit and one combination of an inlet solenoid valve and outlet solenoid valve mounted for the rear brakes circuit in six of the valve mounting bores bored into the housing; and said at least one pressure control valve is a pressure control valve to control the pressure of the rear wheel brakes mounted for the rear brakes circuit in one valve mounting bore between an inlet port to the rear wheel brakes and the inlet solenoid valve of the rear wheel brakes.

* * * * *